(12) United States Patent
Zheng et al.

(10) Patent No.: US 8,892,637 B2
(45) Date of Patent: Nov. 18, 2014

(54) METHOD AND APPARATUS FOR ESTABLISHING GROUPING CONTAINER AND FINDING GROUPING CONTAINER FOR USER

(75) Inventors: Zhihao Zheng, Shenzhen (CN); Yanjie He, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 164 days.

(21) Appl. No.: 13/154,854

(22) Filed: Jun. 7, 2011

(65) Prior Publication Data

US 2011/0238748 A1 Sep. 29, 2011

Related U.S. Application Data

(63) Continuation of application No. PCT/CN2009/075219, filed on Nov. 30, 2009.

(30) Foreign Application Priority Data

Dec. 8, 2008 (CN) .......................... 2008 1 0239282

(51) Int. Cl.
*G06F 15/16* (2006.01)
*G06F 17/30* (2006.01)
*G06Q 10/10* (2012.01)
*H04L 29/08* (2006.01)
*H04L 12/58* (2006.01)

(52) U.S. Cl.
CPC .......... *G06F 17/30964* (2013.01); *G06Q 10/10* (2013.01); *H04L 67/306* (2013.01); *H04L 12/588* (2013.01)
USPC .......................................... 709/203; 709/204

(58) Field of Classification Search
USPC .................................................. 709/203, 204
See application file for complete search history.

(56) References Cited

U.S. PATENT DOCUMENTS

| 2002/0078045 A1* | 6/2002 | Dutta ............................... 707/7 |
| 2006/0085419 A1* | 4/2006 | Rosen ............................... 707/9 |
| 2007/0067269 A1* | 3/2007 | Rudge et al. ...................... 707/3 |
| 2008/0021876 A1* | 1/2008 | Ahern et al. ...................... 707/3 |

(Continued)

FOREIGN PATENT DOCUMENTS

| CN | 1920866 A | 2/2007 |
| CN | 1949732 A | 4/2007 |

(Continued)

OTHER PUBLICATIONS

International Search Report: mailed Mar. 4, 2010; Appln. PCT/CN2009/075219.

*Primary Examiner* — Kenny Lin
(74) *Attorney, Agent, or Firm* — Harness, Dickey & Pierce, P.L.C.

(57) ABSTRACT

A method and apparatus for finding a grouping container for a user and a method and apparatus for establishing a grouping container are provided. The method for finding a grouping container for a user includes: obtaining tag information of a user which includes a key word identifying characteristics of the user; finding a grouping container for the user based on the key word in the tag information and key words of a grouping container; presenting information of the grouping container found to the user, and receiving a confirmation from the user for joining the grouping container. Therefore, it is more convenient for a user to join a grouping container.

18 Claims, 3 Drawing Sheets

(56) References Cited

U.S. PATENT DOCUMENTS

| | | |
|---|---|---|
| 2008/0133716 A1* | 6/2008 | Rao et al. .................. 709/220 |
| 2008/0140650 A1* | 6/2008 | Stackpole .................... 707/5 |
| 2009/0157693 A1* | 6/2009 | Palahnuk ..................... 707/10 |
| 2009/0164884 A1* | 6/2009 | Watson ........................ 715/234 |
| 2009/0228482 A1* | 9/2009 | Ye .............................. 707/5 |
| 2009/0299963 A1* | 12/2009 | Pippuri ........................ 707/3 |
| 2010/0030713 A1* | 2/2010 | Simpson et al. ............ 706/11 |

FOREIGN PATENT DOCUMENTS

| | | |
|---|---|---|
| CN | 101079824 A | 11/2007 |
| CN | 101136927 A | 3/2008 |
| CN | 101420460 A | 4/2009 |
| WO | 2007/118514 A1 | 10/2007 |

* cited by examiner

METHOD AND APPARATUS FOR ESTABLISHING GROUPING CONTAINER AND FINDING GROUPING CONTAINER FOR USER

FIELD OF THE INVENTION

The present invention relates to telecommunications, and particularly to a method and apparatus for establishing a grouping container and finding a grouping container for a user.

BACKGROUND

In telecommunications, a user may establish a grouping container having a certain theme according to practical needs. The grouping container refers to a place where users get together, such as an instant messaging (IM) chat group, a forum, a discussion board, a discussion area, and etc. After that, other users may join the grouping container after searching for the grouping container or after receiving an invitation from a user in the grouping container.

It can be seen that, current grouping containers are established by users, and other users may join the established grouping containers by themselves. Therefore, there will be multiple grouping containers which have the same theme but different names. For example, there may be three grouping containers with their names "I love cars bar", "Shenzhen car owners forum" and "car care discussion group" respectively, and they are independent of each other due to the different names although they have similar themes. For this reason, users from two or more grouping containers having the same hobby or interest can not share contents of the grouping containers. Further, being independent of each other makes users from different grouping containers unable to interact with each other, and thus contents can not accumulate efficiently, which further make each individual grouping container less active.

SUMMARY

Embodiments of the present invention provides a method and apparatus for establishing a group container and finding a grouping container for a user so as to avoid establishing a grouping container which has an identical theme but a different name with an already-established grouping container and inability to share contents between such grouping containers.

Embodiments of the invention provide technical schemes including the ones as follows.

A method for finding a grouping container for a user includes:

obtaining tag information of a user which includes a key word identifying personal characteristics of the user;

finding a grouping container for the user based on the key word in the tag information obtained and key words of a grouping container;

presenting information of the grouping container found to the user, and receiving a confirmation from the user for joining the grouping container.

An apparatus for finding a grouping container for a user includes:

an obtaining unit, configured to obtain tag information of a user which includes a key word identifying personal characteristics of the user;

a matching unit, configured to find a grouping container for the user based on the key word in the tag information obtained and key words of a grouping container;

a prompting unit, configured to present information of the grouping container found to the user, and receive a confirmation from the user for joining the grouping container.

A method for establishing a grouping container for a user includes:

collecting tag information of a user, determining whether frequency or the number of occurrence of a key word in the tag information reaches a defined threshold;

establishing a grouping container corresponding to the key word when the frequency or the number reaches the defined threshold.

An apparatus for establishing a grouping container for a user includes:

a collecting unit, configured to collect tag information of a user, determine whether frequency or the number of occurrence of a key word in the tag information reaches a defined threshold;

a grouping container establishing unit, configured to establish a grouping container in a category corresponding to the key word of which the frequency or the number of occurrence reaches the pre-set threshold.

The above technical schemes provided by embodiments of the present invention are able to find a grouping container having a proper theme for a user according to tag information of the user, thus the user does not have to establish a grouping containing by himself. In this way, the problems introduced when grouping containers are established by users, such as repeat and redundancy of grouping containers having the same theme but different names, and inability of sharing among such grouping containers.

Further, the technical schemes present information of the grouping container found to the user after finding the grouping container for the user, and receive a confirmation from the user for joining the grouping container. Therefore, a user does not need to search for a grouping container or be invited in order to join a grouping container, thus the process of joining a grouping container becomes more convenient and humanized for the user.

DETAILED DESCRIPTION

Technical schemes provided by embodiments of the present invention are hereinafter described clearly and completely in detail with reference to the accompanying drawings. It should be understood that the embodiments described are merely some embodiments of the present invention, not all of the embodiments. Based on the embodiments of the present invention, other embodiments obtained by those skilled in the art without any inventive work are still within the protection scope of the present invention.

Figure 1:
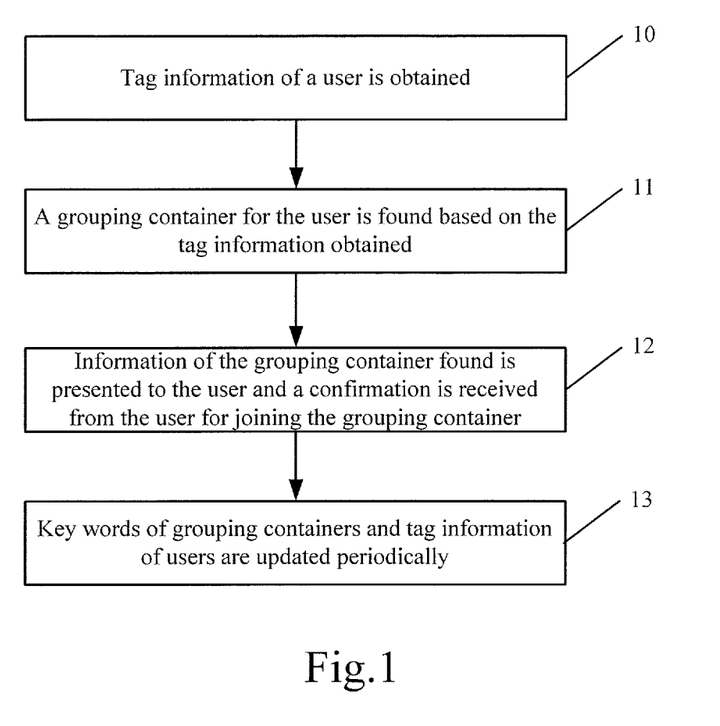
FIG. 1 is a flowchart illustrating a method for finding a matching grouping container for a user according to an embodiment of the present invention.

Referring to FIG. 1, FIG. 1 is a flowchart illustrating a method for finding a grouping container for a user according to an embodiment of the present invention. Taking the process shown in FIG. 1 as an example, the method may include the following steps.

In step 10, tag information of a user is obtained.

The tag information of the user may include a few key words for uniquely identifying personal characteristics of the user, such as a category in which the user is interested.

Preferably, in this embodiment, the manner of obtaining the tag information of the user may include but not limited to the following.

1) The tag information of the user is obtained from personal information of the user.

A system information base stores personal information registered by the user. The personal information may include: key words for differentiating the user from other users, including natural characteristics of the user (e.g. birth date, birth place, age, birth pet and the like of the user), things concerned mostly by the user, key social experiences of the user and so on. Thus, in step 10, the tag information of the user can be directly obtained from the personal information of the user stored in the system information base.

2) The tag information is obtained from customized tag information defined by the user.

Considering applicability of the present invention, a user may define tag information by himself to identify the user in this embodiment. Thus, in step 10, the tag information can be obtained from the customized tag information defined by the user (the tag information may be at least one of the customized tag information). It should be noted that certain restrictions may be set for the customized tag information in this embodiment when the user defines the customized tag information. For example, there may be a restriction on the amount of contents in the customized tag information, e.g., the user is allowed to register only two items of contents; and/or the user is allowed to modify registered customized tag information only at certain time or on certain date (e.g., only one modification is allowed within every 15 or 30 days, etc.); and/or a guidance of defining customized tag information may be provided for the user (e.g., words not allowed in the tag information, exemplary tag information that the user may refer to, auto giving a full name of a grouping container when first characters or words are inputted). Thus, an error message may be provided for the user when it is determined that the customized tag information defined by the user does not conform to rules set by the system, which guarantees the customized tag information defined by the user conforms to system requirements and less changeable.

3) The tag information of the user is determined based on user behaviors collected.

In this method, user's behaviors are collected. For example, the number of blog articles or posts or blogs of a certain category visited or submitted by a user is calculated, or the categories of blogs of buddies of the user are collected; or, for each category, the number of blogs of the buddies of the user falling into the category is calculated. After that, for each category collected, a pre-set threshold is compared with the number of collected behaviors in this category of the user. If the number reaches a threshold, the category is determined as the tag information of the user. For example, when the number or the frequency of visits of a user to posts relating to cars reaches a pre-set threshold, or when the number of blogs of buddies of the user which falls into the category reaches a pre-set threshold, "car" can be determined as the tag information of the user.

It can be understood that the manner of obtaining the tag information of the user is not limited to the above listing. The above listing is merely examples, and which manner is adopted in practice for obtaining the tag information will not affect implementation of the embodiment.

In step 11, a grouping container is found for a user according to the obtained tag information of the user.

Each grouping container is generally associated with multiple key words, and is independent of the contents of other grouping containers. For example, key words of a grouping container may include: car, car-lover, car owner and so on. In order to keep a grouping container up to date, key words of the grouping container may be updated when a pre-set updating condition is satisfied according to practical situations.

A grouping container may be pre-defined in a container base, or be generated dynamically. A pre-defined grouping container in a container base refers to one of fundamental grouping containers pre-defined and stored in the container base, e.g., a container for car, a container for skin-care, a container for economy and so on. The pre-defined grouping container may be manually added and checked by an administrator. A dynamically-generated grouping container refers to a grouping container which is generated when it is determined that the time or frequency of occurrence of a certain category of tag information among all the tag information that is periodically collected in the system reaches a defined threshold. After being generated, the dynamically-generated grouping container is associated with key words. For example, when the number or frequency of occurrence of key words such as "Gao Er Fu" (a Chinese word which means "Golf" in English) or "Gao Qiu" (a Chinese word which also means "Golf" in English) or "Golf" reaches a defined-threshold, a grouping container, i.e. a container for Golf, is generated, and is associated with key words such as "Gao Er Fu", "Gao Qiu", "Golf" and the like. Information relating to the grouping container generated dynamically is stored into the container base.

It can be seen from the above description that the implementation of step 11 may specifically include: comparing the tag information obtained with multiple key words of a grouping container, determining that the grouping container matches the user if the tag information is consistent with one of the key words. There may be multiple grouping containers matching the user.

In step 12, information of the grouping container found is presented to the user and a confirmation from the user for joining the grouping container is received.

After a grouping container matching the user is found, the information of the grouping container found is presented to the user, and a confirmation from the user for joining the grouping container is received. In this embodiment, this step may include selectively presenting relevant descriptions on the grouping container to the user, e.g., contents of the grouping container, time of establishing the grouping container, requirements for users and so on, so that the user may determine whether to join the grouping container based on the relevant descriptions.

The information of the grouping container found for the user may be presented to the user at a place convenient for the user to visit. For example, the information may be presented on a page where the user edits personal information, or on an area presenting a post or a blog article the user is browsing, or via an email to an email address registered by the user, and so on.

Generally, when a user joins a new grouping container, the user may update his personal information or customized tag information. In order to avoid updating personal information or customized tag information by the user frequently to join a new grouping container, a limitation can be set for restricting the frequency of updating personal information or customized tag information by the user. In order to regulate the grouping container, certain conditions of forcedly removing a user may be set, and when a user meets the conditions, the user is forcedly removed from the grouping container. A user may also quit the grouping container on his own initiative. When a user quits the grouping container, contents submitted to the grouping container by the user are stored in the grouping container, instead of being deleted upon the quit of the user.

In step 13, key words of a grouping container and tag information of the user are updated periodically.

The update in step 13 may be as follows: calculating the frequency of occurrence of a key word within a pre-set update cycle, determining whether the frequency reaches a defined threshold, associating the key word with a grouping container of the same category with the key word when the frequency reaches the threshold. For example, a grouping container for cars is associated with key words including car, car-lover and car-owner; when the frequency of occurrence of a key word "car-care" reaches the defined threshold, the key word "car-care" is associated with the grouping container for cars.

In this embodiment, tag information of a user may be updated according to a pre-set update rule. When key words associated with a grouping container and/or tag information of a user is changed, the user may match another grouping container, or a new grouping container should be established according to the above steps 10 and 11, and so on. There is no limitation on the detailed process in this embodiment.

To facilitate understanding the technical schemes, the following describes the method for finding a grouping container for a user according to the above embodiment by referring to specific examples.

Example One

The method in this example includes: storing a grouping container for cars in a system container base, which is associated with key words including car, car-lover, car-owner, car-care and so on; obtaining a key word containing "car" from information of things concerned by a user in personal information inputted by the user after receiving the personal information inputted by the user, comparing the obtained key word with the key words associated with the grouping container for cars, determining there is a key word of the grouping container for cars matching the key word obtained from the personal information, presenting information of the grouping container found to the user in a page presenting personal information of the user, and receiving a confirmation from the user for joining the grouping container for cars. Therefore, the user becomes a member of the grouping container for cars.

Example Two

The method in this example includes: after operating over a period, when the frequency of occurrence of key words, such as "Gao Er Fu" (a Chinese word means "Golf" in English) or "Gao Qiu" (a Chinese word also means "Golf" in English), "Golf" and so on, exceeds a threshold pre-set in the system, a grouping container is established for golf, and determining that key words for the grouping container are "Gao Er Fu", "Gao Qiu" and "Golf", and storing the grouping container into the container base. After that, when tag information of users is obtained, users whose tag information includes any of key words associated with the grouping container for Golf are included in the grouping container, and are informed that the grouping container for Golf is found. Description information of the grouping container for Golf may also be presented to the users, and messages from the users for confirming joining the grouping container for Golf are received.

The method for finding a grouping container for a user in example one can find a grouping container for a user which has a theme in which the user is interested. Thus, there is no need for a user to set up a grouping container by himself; and the method solves problems, such as repeat and redundancy of grouping containers having the same theme but different names, and inability of sharing among such grouping containers. And thus it is convenient for operators to popularize established grouping containers. In addition, users do not have to perform searching to find a grouping container, nor have to wait for being invited to join a grouping container, thus the method is more convenient and humanized for users.

It can be understood that the method for finding a grouping container for a user in the examples does not exclude the approaches for joining a grouping container by conventional manners such as performing searching or being invited. That is, the method can be adopted individually, and can also be adopted along with other method for joining a grouping container.

Another embodiment provides an apparatus for finding a grouping container for a user. Taking the structure shown in FIG. 2 as an example, the apparatus may include an obtaining unit 21, a matching unit 22, and a prompting unit 23.

Figure 2:
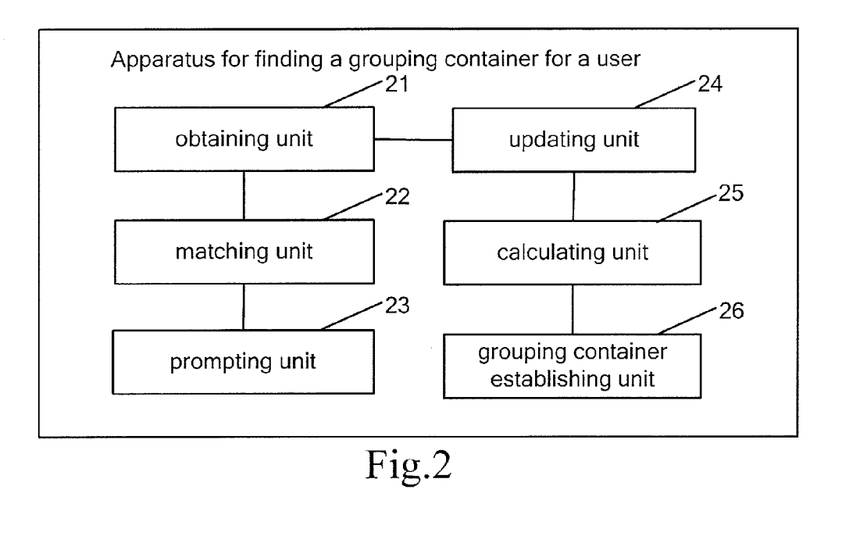
FIG. 2 is a flowchart illustrating a structure of an apparatus for finding a matching grouping container for a user according to an embodiment of the present invention.

The obtaining unit 21 is configured to obtain tag information of a user. Obtaining the tag information of the user is the same as that in step 10 of the above embodiment, thus will not be described further.

The matching unit 22 is configured to find a grouping container for a user according to the tag information obtained by the obtaining unit 21. The matching unit 22 may compare the tag information of the user with multiple key words of a grouping container, and determine that the grouping container matches the user when the tag information is consistent with one of the key words. Multiple grouping containers may be found to match the user.

The prompting unit 23 is configured to present information of the grouping container found for the user to the user, and receive a confirmation from the user for joining the grouping container. Optionally, the prompting unit 23 may further present description information of the grouping container to the user.

The apparatus may further include:

an updating unit 24, configured to update the key words of the grouping container and the tag information of the user according to a pre-set update rule. For example, the updating unit 24 may update the key words of the grouping container and the tag information of the user periodically.

Preferably, the apparatus may further include:

a collecting unit 25, configured to collect the frequency or the number of the occurrence of each category of tag information of users, and determine whether the frequency or the number reaches a pre-set threshold;

a grouping container establishing unit 26, configured to establish a grouping container corresponding to the category of tag information whose frequency or number of occurrence reaches the pre-set threshold.

The apparatus in the embodiment can find a grouping container for a user according to tag information of the user, the user does not have to establish a grouping container on his own initiative, and thus the apparatus solves problems, such as repeat and redundancy of grouping containers caused by grouping containers having the same theme but different names, and inability of sharing contents between the grouping containers. In addition, the user does not have to perform searching or wait for being invited to join a grouping container. Thus, this manner is more convenient and humanized for users.

Figure 3:
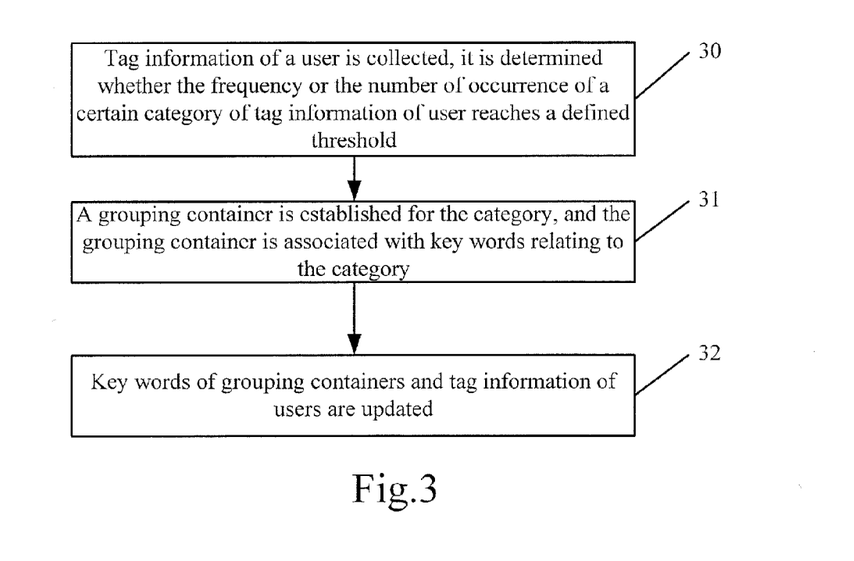
FIG. 3 is a flowchart illustrating a method for establishing a grouping container for a user according to an embodiment of the present invention.

An embodiment provides a method for establishing a grouping container. As shown in FIG. 3, the method mainly includes the following steps.

In step 30, tag information of users is collected, and it is determined whether the frequency or the number of occurrence of a category of tag information reaches a pre-set threshold.

The collecting procedure may be performed periodically.

If the frequency or the number reaches the pre-set threshold, step 31 is performed; otherwise, step 30 is performed.

For example, when the frequency or the number of occurrence of key words such as "GaoErFu", "GaoQiu", "Golf" and so on reaches the pre-set threshold, step 31 is performed.

In step 31, a grouping container is established for the category of tag information, and is associated with key words in connection with the tag information.

Still referring to the above example, when it is determined that the frequency or the number of occurrence of key words such as "GaoErFu", "GaoQiu" and "Golf" in the tag information reaches the pre-set threshold, a grouping container for golf is established, and is associated with the key words such as "GaoErFu", "GaoQiu" and "Golf". Information relating to the grouping container dynamically generated is stored into the container base.

In step 32, key words of the grouping container and tag information of users are updated periodically.

The updating procedure may include: determining whether the frequency of occurrence of a key word within an update cycle reaches a pre-set threshold, and associating the key word with a grouping container for the same category with the key word. For example, key words of a grouping container for cars include car, car-lover and car-owner, and when the frequency of occurrence of a key word "car-care" within an update cycle reaches the pre-set threshold, since "car-care" belongs to the category of car, "car-care" is associated with the grouping container for cars.

Since personal information of a user may change, tag information of the user should be updated accordingly. Or, the tag information of the user is updated according to customized tag information defined by the user from the user. Or, the tag information of the user is updated according to collected behaviors of the user.

This embodiment does not require users to establish grouping containers by themselves, and solves the problems, such as repeat and redundancy of grouping containers having the same theme but different names, and inability to share contents between the grouping containers.

Figure 4:
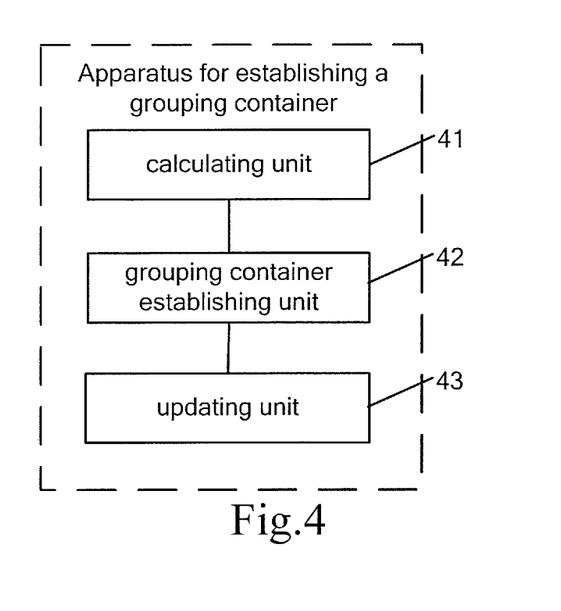
FIG. 4 is a schematic illustrating a structure of an apparatus for generating a grouping container according to an embodiment of the present invention.

An embodiment provides an apparatus for establishing a grouping container. As shown in FIG. 4, the apparatus may include a collecting unit 41, a grouping container establishing unit 42 and an updating unit 43.

The collecting unit 41 is configured to collect the frequency or the number of the occurrence of each category of tag information of users, and determine whether the frequency or the number reaches a pre-set threshold.

The grouping container establishing unit 42 is configured to establish a grouping container corresponding to the category of tag information whose frequency or number of occurrence reaches the pre-set threshold.

The updating unit 43 is configured to update key words of the grouping container and tag information of users periodically.

The apparatus of this embodiment does not require users to establish grouping containers by themselves, and solves the problems of repeat and redundancy of grouping containers having the same theme but different names, and inability to share contents between the grouping containers.

In view of the foregoing, the apparatus of the embodiment can find a grouping container for a user according to tag information of the user, and the user does not have to establish a grouping container on his own initiative, thus solving problems, such as repeat and redundancy of grouping containers caused by grouping containers having the same theme but different names, and inability of sharing contents between the grouping containers. In addition, the user does not have to perform searching or wait for being invited to join a grouping container. Thus, this manner is more convenient and humanized for users.

Those skilled in the art can understand that some or all of the steps of the methods provided by the embodiments may be implemented by software controlling some hardware. The software may be stored in a computer-readable storage medium.

The foregoing is only preferred embodiments of the present invention. The protection scope of the present invention, however, is not limited to the above description. Any alteration or substitution that is within the technical scope disclosed by the present invention and can easily occur to those skilled in the art should be covered in the protection scope of the present invention. Hence the protection scope of the present invention should be determined by the statements in Claims.

The invention claimed is:

1. A method for obtaining a grouping container for a user, comprising:

obtaining tag information of a user without initially inputting the tag information of the user wherein the tag information is obtained during a process of obtaining information about he user, and wherein the tag information includes a key word identifying personal characteristics of the user;

finding a grouping container for the user based on the key word in the tag information obtained and key words of a grouping container, wherein the grouping container comprises a place where users get together; and presenting information of the grouping container found to the user, and receiving a confirmation from the user for joining the grouping container;

wherein the obtaining the tag information of the user comprises:

obtaining the tag information of the user from personal information registered by the user; or obtaining the tag information of the user from customized tag information defined by the user; or determining the tag information of the user based on a behavior of the user;

the method further comprising:

collecting the tag information of the user, determining whether frequency or the number of occurrence of the key word in the tag information reaches a pre-set threshold; and establishing a grouping container corresponding to the key word of which the frequency or the number of occurrence reaches the pre-set threshold.

2. The method of claim 1, further comprising: determining whether the customized tag information defined by the user conforms to a rule pre-set in the system; presenting an error message to the user if the customized tag information defined by the user does not conform to the rule;

wherein determining the tag information of the user based on the behavior of the user comprises:
  collecting categories of blog articles, or posts, or blogs visited or submitted by the user, and/or categories of blogs of buddies of the user;
  determining key words in each of the categories as the tag information of the user when the number of operations performed by the user on each of the categories reaches a pre-set threshold.

3. The method of claim 2, wherein the key words of the grouping container and the tag information of the user are updated according to a pre-set update rule.

4. The method of claim 1, wherein finding the grouping container for the user based on the key word in the tag information of the user and the key words of the grouping container comprises:
  comparing the key word in the tag information of the user with the key words of the grouping container, determining that the user matches the grouping container when the key word in the tag information of the user is consistent with at least one of the key words of the grouping container.

5. The method of claim 4, wherein the key words of the grouping container and the tag information of the user are updated according to a pre-set update rule.

6. The method of claim 1, wherein presenting the information of the grouping container found for the user to the user comprises:
  presenting the information of the grouping container at a place which the user can visit conveniently; wherein the information comprises description information of the grouping container found.

7. The method of claim 6, wherein the key words of the grouping container and the tag information of the user are updated according to a pre-set update rule.

8. The method of claim 1, further comprising: after the user joins in the grouping container,
  removing the user from the grouping container forcedly when the user meets a condition of forcedly removing a user; storing contents submitted to the grouping container by the user into the grouping container.

9. The method of claim 8, wherein the key words of the grouping container and the tag information of the user are updated according to a pre-set update rule.

10. The method of claim 1, wherein the key words of the grouping container and the tag information of the user are updated according to a pre-set update rule.

11. An apparatus for obtaining a grouping container for a user, comprising:
  an obtaining unit, configured to obtain tag information of a user without initially inputting the tag information of the user wherein the tag information is obtained during a process of obtaining information about the user, and wherein the tag information includes a key word identifying personal characteristics of the user;
  a matching unit, configured to find a grouping container for the user based on the key word in the tag information obtained and key words of a grouping container, wherein the grouping container comprises a place where users get together; and
  a prompting unit, configured to present information of the grouping container found to the user, and receive a confirmation from the user for joining the grouping container;
  wherein the obtaining unit is further to obtain the tag information of the user from personal information registered by the user; or to obtain the tag information of the user from customized tag information defined by the user; or to determine the tag information of the user based on a behavior of the user;
the apparatus further comprising:
  a collecting unit, to collect the tag information of the user, determine whether frequency or the number of occurrence of the key word in the tag information reaches a defined threshold; and
  a grouping container establishing unit, to establish a grouping container corresponding to the key word of which the frequency or the number of occurrence reaches the pre-set threshold.

12. The apparatus of claim 11, further comprising:
  an updating unit, configured to update the key words of the grouping container and the tag information of the user respectively according to a pre-set update rule;
  wherein the information of the grouping container presented comprises description information of the grouping container.

13. A method for establishing a grouping container, comprising:
  collecting tag information of a user without initiatively inputting the tag information by the user during a process of collecting the tag information of the user, determining whether frequency or the number of occurrence of a key word in the tag information reaches a defined threshold; wherein the tag information of the user comprises a few key words for uniquely identifying personal characteristics of the user;
  establishing a grouping container corresponding to the key word of which the frequency or the number of occurrence reaches the defined threshold;
  wherein the grouping container comprises a place where users get together.

14. The method of claim 13, wherein the key word of the grouping container and the tag information of the user are updated according to a pre-set update rule.

15. An apparatus for establishing a grouping container, comprising:
  a collecting unit, configured to collect tag information of a user without initially inputting the tag information of the user wherein the tag information is obtained during a process of collectin information about the user, determine whether frequency or the number of occurrence of a key word in the tag information reaches a defined threshold; wherein the tag information of the user comprises a few key words for uniquely identifying personal characteristics of the user;
  a grouping container establishing unit, configured to establish a grouping container in a category corresponding to the key word of which the frequency or the number of occurrence reaches the pre-set threshold;
  wherein the grouping container comprises a place where users get together.

16. The apparatus of claim 15, comprising:
  an obtaining unit, configured to obtain tag information of the user without initially inputting the tag information of the user wherein the tag information is obtained during a process of obtaining information about the user, and wherein the tag information includes a key word identifying personal characteristics of the user;
  a matching unit, configured to find a grouping container for the user based on the key word in the tag information obtained and key words of a grouping container, wherein the grouping container comprises a place where users get together; and a prompting unit, configured to present information of the grouping container found to the user, and receive a confirmation from the user for joining the grouping container.

17. The apparatus of claim 16, wherein the obtaining unit is further to obtain the tag information of the user from personal information registered by the user; or to obtain the tag information of the user from customized tag information defined by the user; or to determine the tag information of the user based on a behavior of the user.

18. The apparatus of claim 17, further comprising:
an updating unit, configured to update the key words of the grouping container and the tag information of the user respectively according to a pre-set update rule;
wherein the information of the grouping container presented comprises description information of the grouping container.

* * * * *